（12）United States Patent
Neurohr et al.

(10) Patent No.: US 7,599,455 B2
(45) Date of Patent: Oct. 6, 2009

(54) METHOD AND APPARATUS FOR DETERMINING AN OUTPUT SEQUENCE FROM AN INPUT SEQUENCE

(75) Inventors: Norbert Neurohr, Neuried (DE); Matthias Schöbinger, München (DE)

(73) Assignee: Infineon Technologies AG, Muncih (DE)

( * ) Notice: Subject to any disclaimer, the term of this patent is extended or adjusted under 35 U.S.C. 154(b) by 520 days.

(21) Appl. No.: 11/361,666

(22) Filed: Feb. 24, 2006

(65) Prior Publication Data

US 2006/0198478 A1    Sep. 7, 2006

(30) Foreign Application Priority Data

Feb. 28, 2005    (DE)    ............ 10 2005 008 988

(51) Int. Cl.
*H04B 1/10*    (2006.01)
(52) U.S. Cl. .................................................. 375/348
(58) Field of Classification Search ......... 375/232–236, 375/348, 350

See application file for complete search history.

(56) References Cited

U.S. PATENT DOCUMENTS

| 5,020,078 | A | 5/1991 | Crespo | |
|---|---|---|---|---|
| 7,302,025 | B2 * | 11/2007 | Ananthaswamy | ........... 375/350 |
| 2003/0202567 | A1 * | 10/2003 | Yousef et al. | ............... 375/148 |
| 2007/0064845 | A1 * | 3/2007 | Phanse et al. | ............... 375/348 |
| 2008/0159453 | A1 * | 7/2008 | Smith | .......................... 375/350 |

* cited by examiner

*Primary Examiner*—Don N Vo
(74) *Attorney, Agent, or Firm*—Brinks Hofer Gilson & Lione

(57) ABSTRACT

A method and a device for determining an output sequence of output elements from an input sequence of input elements is provided, the method or the device being implemented according to a decision feedback equalizer. The adaptation of coefficients of the equalizer is performed on the basis of an estimated error determined as a function of a scaling (a, c0). According to the invention the scaling (a, c0) is determined such that it differs from a nominal input value by a deviation value during transmission without symbol interference. The deviation value is dependent on non-compensatable intersymbol interference.

26 Claims, 2 Drawing Sheets

METHOD AND APPARATUS FOR DETERMINING AN OUTPUT SEQUENCE FROM AN INPUT SEQUENCE

PRIORITY CLAIM

This application claims priority to German Patent Application DE 10 2005 008 988.7, filed on Feb. 28, 2005, which is incorporated by reference in its entirety.

TECHNICAL FIELD

The present invention relates to a method and an apparatus for determining an output sequence from an input sequence with a slicer of a decision feedback equalizer. In particular, the present invention relates to determining a scaling for forming a decision error of a feedback equalizer of this kind, the decision error in turn being used for adapting at least one coefficient of the decision feedback equalizer.

BACKGROUND

A slicer is a device that determines a respective output data value or a respective output element of the output sequence as a function of an input data value or input element of the input sequence, a nominal input element being allocated to each possible output element. Determining the respective output element can be done by comparing the respective input element with one or more decision thresholds fixed depending on the nominal input elements.

Slicers of this kind are normally used when data are received via a transmission channel, in other words, for converting a received input sequence into an output sequence for further processing. Distortions may occur owing to the transmission of the input elements of the input sequence via the transmission channel, which may cause transmission errors. These distortions include, for example, inter-symbol interference (ISI), which leads to influencing of a current receiving element by preceding or optionally also following receiving elements. Equalizers are generally used to balance out distortions of this kind.

Decision feedback equalizers (DFE) are an example of equalizers of this kind. They are employed for equalizing transmission channels with strong inter-symbol interference, in particular if the implementation of a receiver on the basis of the principle of maximum likelihood sequence detection (MLSD) cannot be considered for reasons of complexity or dissipated power or owing to other peripheral conditions of the system, such as, for instance, the limitation of a maximum permissible latency. MLSD in principle offers better equalization. Linear equalizers are relatively easy to implement, for example on the basis of adaptive FIR filters, however noise increases with the strength of the inter-symbol interference. For strong inter-symbol interference, a decision feedback equalizer has less noise and a smaller length. Decision feedback equalizers of are frequently configured such that only a part of the inter-symbol interference which would lead particularly frequently to receiving errors is compensated, whereas weaker contributions are not compensated.

A simple decision feedback equalizer is schematically illustrated in FIG. 1. An analog input signal (receiving signal x) is fed to an analog-to-digital converter (ADC) 1. A sequence of receiving elements y is generated by the ADC 1, from which a respectively allocated correction value c is subtracted in a subtractor 2 to generate a respective differential value d. The sequence of differential values d is then fed to a slicer 3. Depending on the differential value d fed to it in each case, the slicer 3 determines an output symbol value $\hat{y}$ (i.e. output signal), which in error-free transmission corresponds to a send symbol sent for generating the receiving signal x.

If a digital signal sequence is sent in which two possible values are represented by a positive value of the send symbol and a corresponding negative value of the respective send symbol of the signal sequence, the slicer 3 can compare the respective differential value d with a decision threshold of zero and at d>0 can output a value $\hat{y}=1$ and at d<0 a value $\hat{y}=-1$. The values +1 and -1 are here to be understood as examples; in principle any other pair of values suitable for the subsequent processing is also conceivable.

Each output symbol $\hat{y}$ is fed to a delay element 7 and multiplied in a multiplier 11 by a coefficient c1 to generate the correction value c for the next input value y. Therefore, in the simple decision feedback equalizer illustrated, in each case the correction value c is determined for a receiving value y on the basis of the preceding output symbol value $\hat{y}$. By means of a decision feedback equalizer of this kind it is possible to compensate inter-symbol interference which originates from a receiving value preceding the current receiving value.

Frequently, there are several feedback paths of this kind with delay element and multiplier in decision feedback equalizers and the correction value c is generated by weighting and combination of several preceding output symbols $\hat{y}$ to be able to correct the influence of several preceding receiving values to the current receiving value. However, these feedback paths are not necessary for understanding the present invention and have therefore not been illustrated for the sake of simplicity. The principle is in this case the same as with only one feedback path.

Furthermore, the respective output symbol $\hat{y}$ is multiplied by a scaling factor c0 in a multiplier 9 and subtracted from the differential value d on the basis of which the output symbol value $\hat{y}$ was determined in a subtractor 10 to form a decision error e. The scaling factor c0 is normally chosen such that with full equalization and otherwise undisturbed transmission the differential values d would correspond to the output symbol values $\hat{y}$ multiplied by c0. If the differential values d, with undisturbed transmission and full compensation of the inter-symbol interference, had the possible values $+h_0$ and $-h_0$ and the output symbol values $\hat{y}$ correspondingly the possible values +1 and -1, c0 would be set at $h_0$. This means that the estimated error is e=0 if the differential value d coincides with the respective nominal differential value $\pm h_0$ in the case of perfect equalization and otherwise undisturbed transmission.

The estimated error e is used in operation of the decision feedback equalizer in particular to adapt the coefficient(s) of the equalizer, in the present example coefficient c1 to match the distortion properties to the transmission channel via which the analog receiving signal x is received, as its properties generally change over time. This can be done, for example, with a least mean square algorithm in which coefficient c1 is adapted according to:

$$c1_{k+1} = c1_k + v \cdot e_k \cdot \operatorname{sign}(\hat{y}_{k-1}) \tag{1}$$

wherein v is a step width and k a running index, k=1, 2 . . . , which characterizes a respective element of the sequence of coefficients c1, of estimated errors e or of output symbols $\hat{y}$. An output symbol $\hat{y}_{k-1}$ preceding the estimated error $e_k$ is used for this, as the estimated error $e_k$ originating from the output symbol $\hat{y}_{k-1}$ is to be minimized.

To simplify the calculation of equation (1), instead of the estimated error $e_k$, frequently only its sign is used. This is also illustrated in FIG. 1. Here a sign formation unit 8 forms the sign $se_k$ of the estimated error e. The adaptation of coefficient c1 is then carried out in an adaptation unit 32, for example, according to:

$$c1_{k+1}=c1_k+v \cdot se_k \cdot \text{sign}(\hat{y}_{k-1}) \quad (2).$$

If the output symbols $\hat{y}_k$ adopt only values +1 and −1, sign $(\hat{y}_{k-1})=\hat{y}_{k-1}$ applies, so there is no need to form the sign. In the decision feedback equalizer from FIG. 1, it is naturally also possible to scale the differential value d accordingly instead of the output symbol $\hat{y}$, to form the estimated error.

In FIG. 2, a further decision feedback equalizer is illustrated, which differs from the equalizer in FIG. 1 only in the way the estimated error e is determined. Therefore only this part of FIG. 2 is explained in greater detail; otherwise FIG. 2 corresponds to the already discussed FIG. 1.

In the equalizer of FIG. 2 the differential values d are fed not only to the slicer 3, but also to a positive input of a subtractor 5 and an input of an adder 4. A reference value a is fed to a negative input of the subtractor 5 and to a further input of the adder 4, so that a value e1=d−a and a value e2=d+a are generated. The values e1 and e2 are fed to a multiplexer 6, by which either value e1 or value e2 is selected as estimated error e, depending on the respective output symbol $\hat{y}$.

The reference value a corresponds in function to the scaling factor c0 from FIG. 1.

This will be explained again for the example where the output symbol $\hat{y}$ can adopt the values +1 and −1 and the differential value d with undisturbed transmission and full compensation of inter-symbol interference, the values $+h_0$ or $-h_0$. For this case the reference value a is normally set at $h_0$. Therefore e1=d−$h_0$ and e2=d+$h_0$ apply, corresponding exactly to the possible values for the estimated error. Correspondingly, e1 is selected by the multiplexer 6 as estimated error e for $\hat{y}$=+1 and e2 for $\hat{y}$=−1.

Decision feedback equalizers of this kind, as illustrated in FIG. 2, are useful in high speed applications, as the feedback of the output symbol $\hat{y}$ into the subtractor 10 in FIG. 1 is time-critical, since it is here that the output symbol $\hat{y}$ is subtracted from the differential value d as a function of which it was formed, to form the estimated error. On the other hand, in the look-ahead method of FIG. 2 such feedback is not present.

With the decision feedback equalizer from FIG. 2, the estimated error e (for example according to equation (1)) or its sign se (for example according to equation (2)) can also be used to adapt the coefficient c1. The use of the sign se again enables simpler implementation of the adaptation algorithm, as instead of multiplication only the sign (in digital implementation a corresponding sign bit) is altered.

However, if full compensation of inter-symbol interference does not occur, the problem discussed below may occur.

For this a pulse response of a transmission channel with a main value $h_0$, a pre-pulse oscillator $h_{-1}$ and a post-pulse oscillator $h_1$ are illustrated in FIG. 3 by way of example. This means that a receiving element $y_k$ of the receiving sequence is calculated from a sent sequence $b_k$, transmitted via the transmission channel, according to:

$$y_k = h_1 b_{k-1} + h_0 b_k + h_{-1} b_{k+1} \quad (3)$$

By means of decision feedback equalizers as shown in FIGS. 1 and 2, by suitable choice of the coefficient c1 the influence of the term $h_1 b_{k-1}$ from equation (3), in other words the influence of the post-pulse oscillator h1, can be compensated, whereas the pre-pulse oscillator $h_{-1}$ is not compensated.

If the adaptation process, as described with reference to equations (1) and (2), is carried out, this leads to the behavior illustrated schematically in FIG. 4. It has here been assumed that the $b_k$ from equation (3) can adopt only the values +1 and −1. For this case, in FIG. 4 curves 12 to 15 show possible values of the differential value d at the input of the slicer 3 of the decision feedback equalizers of FIGS. 1 and 2 over the time t. Initially a total of eight different values $\pm h_0 \pm h_1 \pm h_{-1}$ is possible, only the positive values (corresponding to $a_k$=+1 in equation (3)) being illustrated. To calculate the decision error, as already explained, in FIG. 1 a scaling factor c0=$h_0$ or in FIG. 2 a reference value a=$h_0$ is used. In the course of the adaptation, the values d should from now on change according to the solid curves 12 to 15, so that after completion of the adaptation the two values $h_0+h_{-1}$ and $h_0-h_{-1}$ indicated by the dotted curves 30 and 31 result. In these values the influence of the post-pulse oscillator $h_1$ is fully compensated.

According to equations (1) and (2) setting the coefficient c1 is done in proportion to the (signed) decision error or to its sign. If the sign algorithm from equation (2) is used, the problem now occurs that the sign changes its sign at the crossing point of curves 13 and 14 with $h_0$. As only the sign and not the value of the estimated error is taken into account, the decision errors of curves 12 and 15 balance one another out on average and the setting of the equalizer coefficients remains constant on average. The values at the slicer input therefore emerge according to the dotted curves 16, 17 and 18 of FIG. 4. This is substantially because from the above mentioned crossing point onwards the influence of the pre-pulse oscillator $h_{-1}$, which is not corrected, is ruling for the estimated error.

The minimum distance of these curves, in particular curve 16, from a slicer threshold x0=0 is less than in the optimum case, leading to an increased bit error rate.

BRIEF DESCRIPTION OF THE DRAWINGS

The present invention is illustrated by way of example and not limited to the accompanying figures in which like references indicate similar elements. Exemplary embodiments will be explained in the following text with reference to the attached drawings, in which.

Skilled artisans appreciate that elements in the figures are illustrated for simplicity and clarity and have not necessarily been drawn to scale.

DETAILED DESCRIPTION

A method and a corresponding apparatus are presented for determining the output sequence from an input sequence. Using the method and apparatus, a better convergence to optimum values is achieved during adaptation of a decision feedback equalizer used. In the method, each input element is combined with a respective correction element for correcting a part of the inter-symbol interference to form a corrected input element. A respective output element of the output sequence is formed as a function of the corrected input element. A respective estimated error is formed as a function of the corrected input element, the respective output element and a scaling. A deviation between the corrected input element and the respective output element scaled with the scaling is characterized. The respective correction element is formed as a function of at least one coefficient and at least one output element preceding the respective output element. The coefficient is adapted as a function of an estimated error allocated to an output element preceding the respective output element, preferably as a function of the sign of this estimated error. The scaling is determined such that it differs from a nominal corrected input element with full correction of all the inter-symbol interference by a value dependent on a further part of the inter-symbol interference unable to be corrected by the correction element.

By using scaling of this kind, which differs from normal scaling for determining the estimated error, better compensation of inter-symbol interference can be achieved. Non-compensatable inter-symbol interference may be interference by output elements following the respective output element, whereas inter-symbol interference by one or more output elements preceding the respective output element can be compensated by the respective correction element. Setting the scaling can be done adaptively. In this case, differential values, the deviations of which from nominal values owing to non-compensatable interference have the same signs, may be used in both cases for adaptation of the scaling and adaptation of the at least one coefficient, which can occur simultaneously.

Turning back to the figures, the adaptation of coefficients of a decision feedback equalizer and determining corresponding decision errors is described. The decision feedback equalizers shown in FIGS. 1 and 2 and already described in detail are here used to explain one embodiment of the present invention. To avoid repetition, the elements of these decision feedback equalizers are not explained again in detail. Instead, the modifications of the known devices will be examined below.

Figure 1:
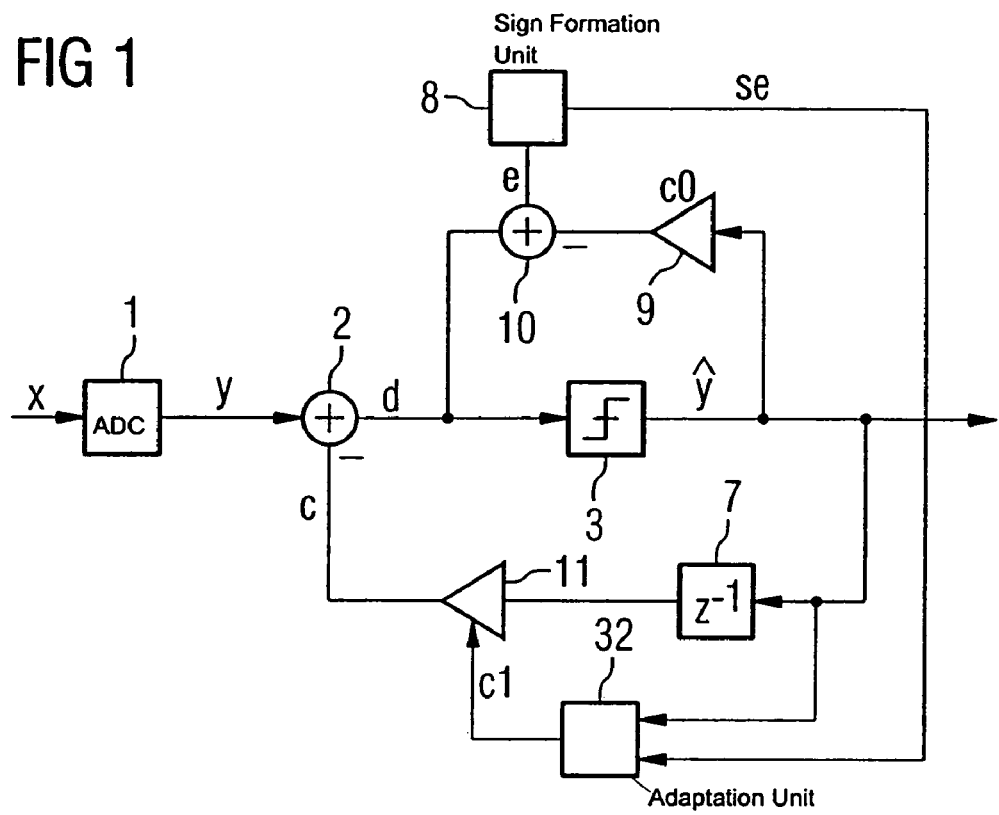
FIG. 1 shows a first decision feedback equalizer in which one embodiment of the method according to the invention can be implemented.
Figure 2:
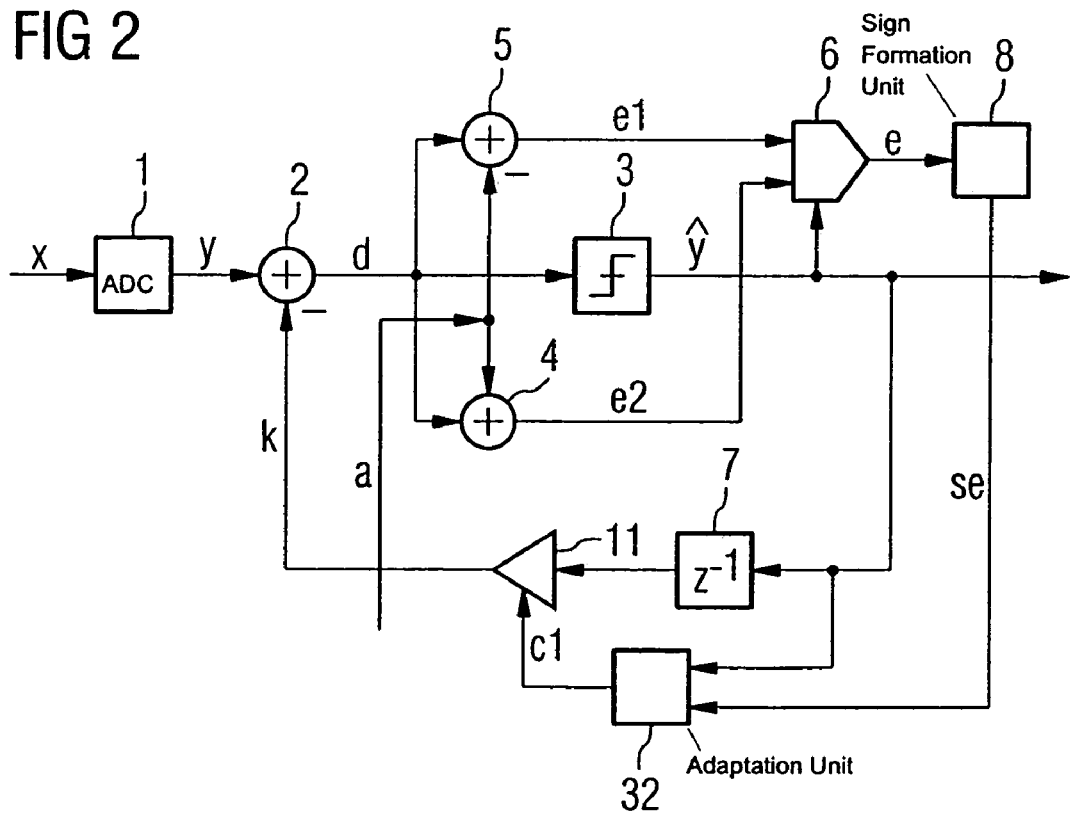
FIG. 2 shows a second decision feedback equalizer in which one embodiment of the method according to the invention can be implemented.

In particular, the scaling factor c0 by which the respective output symbol ŷ is multiplied in the multiplier 9 of FIG. 1 or correspondingly determining a suitable reference value a in FIG. 2 is determined. Scaling factor c0 and reference value a are designated below combined as scaling. The coefficient c1 is adapted by the adaptation means 32 of FIGS. 1 and 2.

Figure 3:
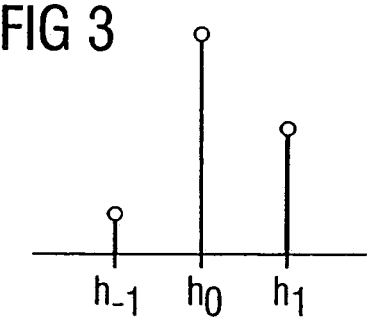
FIG. 3 shows a pulse response of a transmission channel by way of example.

As an example, a transmission channel with a pulse response as illustrated in FIG. 3 is again looked at, in which the receiving elements y are formed according to equation (3). Furthermore, it is assumed as an example that a binary transmission is taking place, wherein the values of the send sequence $b_k$ and correspondingly the output symbols ŷ can adopt the values +1 and −1.

In this case, the input elements y adopt the values $\pm h_0$ during undisturbed transmission (no inter-symbol interference), in other words $\pm h_0$ are nominal input values for the output symbols ±1. Therefore the scaling a or c0 is normally set at $h_0$, so the decision error e characterizes a deviation of the differential value d from the respective nominal input value.

A value is now determined as scaling, which differs from the value $h_0$ by an amount depending on non-compensatable portions of the input elements or the differential values d. As already described, only the post-pulse oscillator $h_1$ can be compensated by the decision feedback equalizers illustrated, whereas the pre-pulse oscillator $h_{-1}$ is not compensated. In the present case, the deviation of the scaling from the value $h_0$ is determined as a function of the value $h_{-1}$.

In the present case, the value $h_0 - h_1$ may be fixed as scaling a or c0. This results in curve 15 of FIG. 4, which is closest to the slicer threshold x0=0, converging on the dotted line 31 when the sign algorithm from equation (2) is used and thus a minimum distance of the possible input values at the slicer 3 in FIGS. 1 and 2 from the decision threshold x0 in an adjusted state being greater than when a scaling $h_0$ is used.

If the transmission behavior of the transmission channel is known or if it is ascertained by separate measurements, a corresponding scaling can be directly determined. If this is not the case, appropriate scaling can be determined adaptively. A possible circuit arrangement for this is illustrated in FIG. 5.

Figure 5:
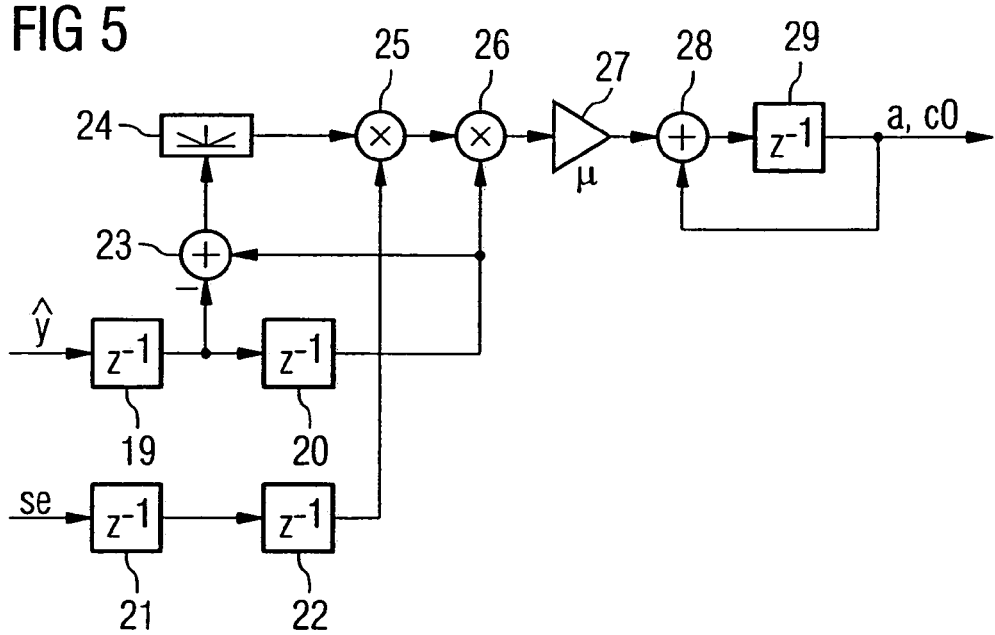
FIG. 5 shows a device according to one embodiment of the invention for adapting a scaling.

The output symbols ŷ and the signs se of the estimated errors are fed to the circuit arrangement of FIG. 5—similar to the adaptation means 32 of FIGS. 1 and 2 for adapting the coefficient c1. The signs se of the estimated errors are fed to delay elements 21 and 22 switched in succession. These and the further delay elements illustrated in the circuit arrangement of FIG. 5 delay a value fed to them by one operating cycle period of the circuit in each case.

An output of delay element 22 is connected to an input of a multiplier 25. The output symbols ŷ are fed to a delay element 19, an output of delay element 19 being connected to a negative input of a subtractor 23 and a delay element 20. An output of delay element 20 is connected to a positive input of the subtractor 23 and to an input of a multiplier 26. An output of the subtractor 23 is connected to amount forming means 24 which form half the amount of the value fed to them. An output of the amount forming means 24 is connected to a further input of multiplier 25, an output of multiplier 25 is connected to a further input of multiplier 26. An output of multiplier 26 is connected to an input of a multiplier 27, which multiplies the values fed to it by a step width µ. The values thus multiplied by the step width µ are integrated up by an integrator formed by an adder 28 with delay element 29 connected downstream, the output of which is looped back to an input of the adder 28. Overall the scaling a is therefore adapted according to:

$$a_{k+1} = a_k + \mu s e_k \cdot \tfrac{1}{2}|\hat{y}_{k+1} - \hat{y}_k| \cdot \hat{y}_k \qquad (4),$$

wherein $a_k$ is a kth reference value a or correspondingly a kth scaling factor c0 and k again generally designates a running index.

The term $\tfrac{1}{2}|\hat{y}_{k+1} - \hat{y}_k|$ is here equal to zero if $\hat{y}_{k+1} = \hat{y}_k$, in other words if $\hat{y}_{k+1}$ and $\hat{y}_k$ are both equal to +1 or both equal to −1. If the values $\hat{y}_{k+1}$ and $\hat{y}_k$ are different, on the other hand, the term $\tfrac{1}{2}|\hat{y}_{k+1} - \hat{y}_k|$ has the value 1. Adaptation of the scaling a is therefore done only if the values $\hat{y}_{k+1}$ and $\hat{y}_k$ have different signs. As, if no transmission errors occur, the values $\hat{y}_{k+1}$ and $\hat{y}_k$ correspond to corresponding values $b_{k+1}$ and $b_k$ of the send sequence, the scaling is therefore adapted if a corresponding value of the input sequence y minus the influence of the post-pulse oscillator $h_1$ to be compensated corresponds to either $h_0 - h_{-1}$ or the corresponding negative value $-h_0 + h_{-1}$ (cf. equation (3)). In this way, the reference value a is set adaptively to the value $h_0 - h_{-1}$. Correspondingly the value c0 can of course also be set for the decision feedback equalizer of FIG. 1.

It should be noted that in equation (4), instead of the values $\hat{y}_{k+1}$ and $\hat{y}_k$, their signs could also be used with the same result, which can be used if the output symbols ŷ can adopt other values than +1 and −1, optionally also more than two values, for example +2, +1, −1 and −2. Additionally the factor ½ can also be brought into the step width. For faster convergence it can additionally be provided gradually to reduce the step width µ.

This adaptation of the scaling with the circuit from FIG. 5 can be done at the same time as adaptation of the coefficient c1 according to equation (2). In this way scaling and coefficient can converge to a common optimum. To achieve good convergence of coefficient c1 to an optimum value, corresponding to the adaptation of the scaling from equation (4), coefficient c1 can be adapted only if the signs of $b_{k+1}$ and $b_k$ are different. Here too, adaptation of the coefficient c1 then therefore follows substantially on the basis of the solid curves 13 and 15 of FIG. 4, yet the thus ascertained coefficient c1 is also an optimum coefficient for the remaining input values corresponding to curves 12 and 14.

"Selective" adaptation of the coefficient c1 of this kind can correspondingly be done for adapting the scaling according to equation (4) by adopting a factor $\frac{1}{2}|\hat{y}_{k+1}-\hat{y}_k|$ in equation (1) or (2), for which a circuit similar to that of FIG. 5 can be used.

As already mentioned, the formation of the correction value k on the basis of a preceding output symbol and a coefficient c1 illustrated in FIGS. 1 and 2 serves only as an example and normally more than one coefficient is used, whereby in particular further "post-pulse oscillators" $h_2$, $h_3$, etc. can be compensated. For this case, selective adaptation of the coefficients could be done corresponding, for example, to:

$$c_{j,k+1}=c_{j,k}+vse_k\text{sign}(\hat{y}_{k-j})\frac{1}{2}|\hat{y}_{k+1}-\hat{y}_k| \qquad (5),$$

wherein j=1, 2, ..., N indicates a number of the coefficient. The correction value k would then be formed according to:

$$k = \sum_{j=1}^{N} c_j \hat{y}_{k-j}. \qquad (6)$$

Figure 4:
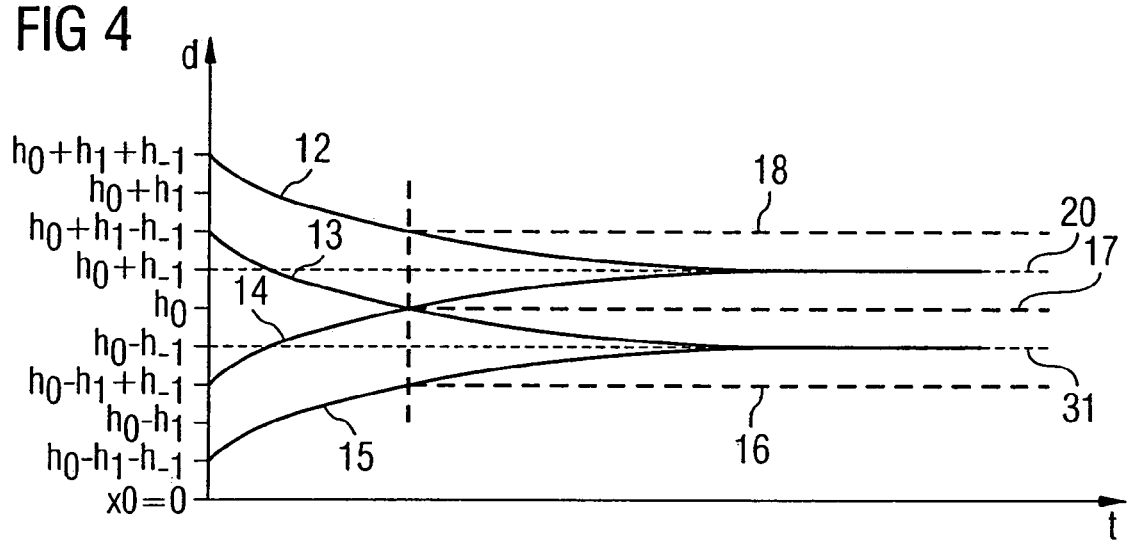
FIG. 4 shows a representation of the adaptation of coefficients of a decision feedback equalizer.

It should be noted that the selective adaptation of the coefficient described, while leading to quicker convergence may or may not be used, as in the case of non-selective adaptation the influence of values from curves 12 and 14 of FIG. 4 would be accentuated.

As already mentioned, adaptation of the method to non-binary sequences, in other words send sequences in which the values $b_k$ can adopt more values than only +1 and −1 (which then also applies correspondingly to the output symbols $\hat{y}$), is possible. For this $\hat{y}_k$ or $\hat{y}_{k+1}$ can be replaced in equation (4) by the sign of the respective output symbol.

In principle, adaptation of the coefficients on the basis of curves 12 and 14 with an (adapted or preset) reference value $h_0+h_{-1}$ is also possible, instead of the described adaptation on the basis of the solid curves 13 and 15 of FIG. 4 with (adapted or preset) scaling $h_0-h_{-1}$. For this, the subtractor 23 from FIG. 5 is replaced by an adder, for example, so that in equation (4) the factor $\frac{1}{2}|\hat{y}_{k+1}+\hat{y}_k|$ would stand. Adaptation is therefore performed only if the signs of $\hat{y}_{k+1}$ and $\hat{y}_k$ are identical. The same then applies to the selective adaptation from equation (5).

In conclusion, when using an adaptation on the basis of the sign of the decision error, better compensation of inter-symbol interference by a decision feedback equalizer can be achieved, resulting in a greater distance of equalized values in the adjusted state from a decision threshold of a slicer.

It is therefore intended that the foregoing detailed description be regarded as illustrative rather than limiting, and that it be understood that it is the following claims, including all equivalents, that are intended to define the spirit and scope of this invention. Nor is anything in the foregoing description intended to disavow scope of the invention as claimed or any equivalents thereof.

We claim:

1. A method for determining an output sequence of output elements from an input sequence of input elements, formed by transmission of a send sequence via a transmission channel, in which inter-symbol interference occurs, the method comprising:

providing an input sequence of input elements from the transmission channel to a processor;

combining each input element with a respective correction element, to form a corrected input element, wherein a first part of the inter-symbol interference is configured to be corrected by the correction element and a second part of the inter-symbol interference is configured to not be corrected by the correction element;

forming a respective output element of the output sequence as a function of the corrected input element;

forming a respective estimated error as a function of the corrected input element, the respective output element and a scaling;

characterizing a deviation between the corrected input element and the respective output element scaled with the scaling;

forming the respective correction element as a function of a coefficient and an output element preceding the respective output element;

adapting the coefficient as a function of an estimated error allocated to the output element preceding the respective output element;

determining the scaling such that the scaling differs from a nominal corrected input element, with full correction of all the inter-symbol interference, by a value dependent on the second part of the inter-symbol interference; and providing the output sequence from the processor to another transmission channel.

2. The method according to claim 1, wherein the coefficient is adapted as a function of a sign of the estimated error allocated to the output element preceding the respective output element.

3. The method according to claim 1, wherein the scaling is smaller than an amount of a nominal corrected input element by an amount of a non compensatable part of the inter-symbol interference.

4. The method according to claim 1, wherein the coefficient is adapted only if a portion of the respective corrected input element conditional on a non compensatable part of the inter-symbol interference has a different sign from a portion of the respective input element which is not conditional on inter-symbol interference.

5. The method according to claim 4, wherein the coefficient comprises coefficients $c_j$, j=1 ... N, N≧1, wherein the respective correction value is formed according to:

$$c = \sum_{j=1}^{N} c_j \hat{y}_{k-j},$$

wherein c is the respective correction value, $\hat{y}_k$ is the respective output element and $\hat{y}_{k-j}$ is an output element preceding the respective output element by j output elements, and wherein the coefficient is adapted according to:

$$c_{j,k+1}=c_{j,k}+v\text{sign}(e_k)\text{sign}(\hat{y}_{k-j})|\text{sign}(\hat{y}_{k+1})-\text{sign}(\hat{y}_k)|,$$

wherein v is a step width and $e_k$ is a kth estimated error.

6. A method for determining an output sequence of output elements from an input sequence of input elements, formed by transmission of a send sequence via a transmission channel, in which inter-symbol interference occurs, the method comprising:
- providing an input sequence of input elements from the transmission channel to a processor;
- combining each input element with a respective correction element, to form a corrected input element, wherein a first part of the inter-symbol interference is configured to be corrected by the correction element and a second part of the inter-symbol interference is configured to not be corrected by the correction element;
- forming a respective output element of the output sequence as a function of the corrected input element;
- forming a respective estimated error as a function of the corrected input element, the respective output element and a scaling;
- characterizing a deviation between the corrected input element and the respective output element scaled with the scaling;
- forming the respective correction element as a function of a coefficient and an output element preceding the respective output element;
- adapting the coefficient as a function of an estimated error allocated to the output element preceding the respective output element;
- determining the scaling such that the scaling differs from a nominal corrected input element, with full correction of all the inter-symbol interference, by a value dependent on the second part of the inter-symbol interference, the scaling adaptively determined as a function of the output element preceding the respective output element and an estimated error allocated to the output element preceding the respective output element; and
- providing the output sequence from the processor to another transmission channel.

7. The method according to claim 6, wherein the scaling is adapted according to:

$$a_{k+1}=a_k+\mu \cdot \text{sign}(e_k) \cdot |\text{sign}(\hat{y}_{k-1}) - \text{sign}(\hat{y}_k)| \cdot \text{sign}(\hat{y}_k)$$

wherein $a_k$ is a kth value of the scaling, $e_k$ is a kth value of the estimated error, $\hat{y}_k$ is a kth value of the output symbol and $\mu$ is a step width.

8. The method according to claim 6, wherein the scaling is adapted according to:

$$a_{k+1}=a_k+\mu \cdot \text{sign}(e_k) \cdot |\text{sign}(\hat{y}_{k+1}) + \text{sign}(\hat{y}_k)| \cdot \text{sign}(\hat{y}_k)$$

wherein $a_k$ is a kth value of the scaling, $e_k$ is a kth value of the estimated error, $\hat{y}_k$ is a kth value of the output symbol and $\mu$ is a step width.

9. The method according to claim 6, wherein the coefficient is adapted only if a portion of the respective corrected input element conditional on a non compensatable part of the inter-symbol interference has the same sign as a portion of the respective input element which is not conditional on inter-symbol interference.

10. The method according to claim 9,
wherein the coefficient comprises coefficients cj, j=1 ... N, N≥1,
wherein the respective correction value is formed according to:

$$k = \sum_{j=1}^{N} c_j \hat{y}_{k-j},$$

wherein c is the respective correction value, $\hat{y}_k$ is the respective output element and $\hat{y}_{k-j}$ is an output element preceding the respective output element by j output elements, and
wherein the coefficient is adapted according to:

$$c_{j,k+1}=c_{j,k}+v \cdot \text{sign}(e_k) \cdot \text{sign}(\hat{y}_{k-j}) \cdot |\text{sign}(\hat{y}_{k+1}) - \text{sign}(\hat{y}_k)|,$$

wherein v is a step width and $e_k$ is a kth estimated error.

11. An apparatus for determining an output sequence of output elements from an input sequence of input elements, formed by transmission of a send sequence via a transmission channel, wherein inter-symbol interference occurs, the apparatus comprising:
- a correction device to combine each input element with a respective correction element to form a corrected input element, wherein a first part of the inter-symbol interference is configured to be corrected by the correction element and a second part of the inter-symbol interferences is configured to not be corrected by the correction element;
- a determining device to determine a respective output element of the output sequence as a function of the corrected input element;
- an estimated error formation device to form an estimated error as a function of the corrected input element, the respective output element and a scaling, the estimated error characterizing a deviation between the corrected input element and the respective output element scaled with the scaling;
- a correction value formation device to form the respective correction value as a function of a coefficient and an output element preceding the respective output element; and
- an adaptation device to adapt the coefficient as a function of an estimated error allocated to the output element preceding the respective output element,
- wherein the scaling differs from a nominal corrected input element, with full correction of all the inter-symbol interference, by a value dependent on the second part of the inter-symbol interference.

12. The apparatus according to claim 11, wherein the coefficient is adapted as a function of a sign of the estimated error allocated to the output element preceding the respective output element.

13. The apparatus according to claim 11, wherein the scaling is smaller than an amount of a nominal corrected input element by an amount of a non compensatable part of the inter-symbol interference.

14. The apparatus according to claim 11, wherein the coefficient is adapted only if a portion of the respective corrected input element conditional on a non compensatable part of the inter-symbol interference has a different sign from a portion of the respective input element which is not conditional on the inter-symbol interference.

15. The apparatus according to claim 14,
wherein the coefficient comprises coefficients $c_j$, j=1 ... N, N≥1,
wherein the respective correction value is formed according to:

$$c = \sum_{j=1}^{N} c_j \hat{y}_{k-j},$$

wherein c is the respective correction value, $\hat{y}_k$ is the respective output element and $\hat{y}_{k-j}$ is an output element preceding the respective output element by j output elements, and wherein the coefficient is adapted according to:

$$c_{j,k+1} = c_{j,k} + v \cdot \text{sign}(e_k) \text{sign}(\hat{y}_{k-j}) |\text{sign}(\hat{y}_{k+1}) - \text{sign}(\hat{y}_k)|,$$

wherein v is a step width and $e_k$ is a kth estimated error.

16. An apparatus for determining an output sequence of output elements from an input sequence of input elements, formed by transmission of a send sequence via a transmission channel, wherein inter-symbol interference occurs, the apparatus comprising:

a correction device to combine each input element with a respective correction element to form a corrected input element, wherein a first part of the inter-symbol interference is configured to be corrected by the correction element and a second part of the inter-symbol interferences is configured to not be corrected by the correction element;

a determining device to determine a respective output element of the output sequence as a function of the corrected input element;

an estimated error formation device to form an estimated error as a function of the corrected input element, the respective output element and a scaling, the estimated error characterizing a deviation between the corrected input element and the respective output element scaled with the scaling;

a correction value formation device to form the respective correction value as a function of a coefficient and an output element preceding the respective output element; and an adaptation device to adapt the coefficient as a function of an estimated error allocated to the output element preceding the respective output element, wherein the scaling differs from a nominal corrected input element, with full correction of all the inter-symbol interference, by a value dependent on the second part of the inter-symbol interference, the scaling adaptively determined as a function of the output element preceding the respective output element and an estimated error allocated to the output element preceding the respective output element.

17. The apparatus according to claim 16, wherein the scaling is adapted according to:

$$a_{k+1} = a_k + \mu \cdot \text{sign}(e_k) \cdot |\text{sign}(\hat{y}_{k-1}) - \text{sign}(\hat{y}_k)| \cdot \text{sign}(\hat{y}_k)$$

wherein $a_k$ is a kth value of the scaling, $e_k$ is a kth value of the estimated error, $\hat{y}_k$ is a kth value of the output symbol, and $\mu$ is a step width.

18. The apparatus according to claim 16, wherein the scaling is adapted according to:

$$a_{k+1} = a_k + \mu \cdot \text{sign}(e_k) \cdot |\text{sign}(\hat{y}_{k+1}) + \text{sign}(\hat{y}_k)| \cdot \text{sign}(\hat{y}_k)$$

wherein $a_k$ is a kth value of the scaling, $e_k$ is a kth value of the estimated error, $\hat{y}_k$ is a kth value of the output symbol, and $\mu$ is a step width.

19. The apparatus according to claim 16, wherein the coefficient is adapted only if a portion of the respective corrected input element conditional on a non compensatable part of the inter-symbol interference has the same sign as a portion of the respective input element which is not conditional on the inter-symbol interference.

20. The apparatus according to claim 19,
wherein the coefficient comprises coefficients cj, j=1 ... N, N≧1,
wherein the respective correction value is formed according to:

$$k = \sum_{j=1}^{N} c_j \hat{y}_{k-j},$$

wherein c is the respective correction value, $\hat{y}_k$ is the respective output element and $\hat{y}_{k-j}$ is an output element preceding the respective output element by j output elements, and wherein the coefficient is adapted according to:

$$c_{j,k+1} = c_{j,k} + v \cdot \text{sign}(e_k) \text{sign}(\hat{y}_{k-j}) |\text{sign}(\hat{y}_{k+1}) - \text{sign}(\hat{y}_k)|,$$

wherein v is a step width and $e_k$ is a kth estimated error.

21. An apparatus for determining an output sequence of output elements from an input sequence of input elements, formed by transmission of a send sequence via a transmission channel, wherein inter-symbol interference occurs, the apparatus comprising:

means for combining each input element with a respective correction element to form a corrected input element, wherein a first part of the inter-symbol interference is configured to be corrected by the correction element and a second part of the inter-symbol interferences is configured to not be corrected by the correction element;

means for determining a respective output element of the output sequence as a function of the corrected input element;

means for forming an estimated error as a function of the corrected input element, the respective output element and a scaling, the estimated error characterizing a deviation between the corrected input element and the respective output element scaled with the scaling;

means for forming the respective correction value as a function of a coefficient and an output element preceding the respective output element; and means for adapting the coefficient as a function of an estimated error allocated to the output element preceding the respective output element, wherein the scaling differs from a nominal corrected input element, with full correction of all the inter-symbol interference, by a value dependent on the second part of the inter-symbol interference.

22. The apparatus according to claim 21, wherein the coefficient is adapted as a function of a sign of the estimated error allocated to the output element preceding the respective output element.

23. The apparatus according to claim 21, wherein the scaling is smaller than an amount of a nominal corrected input element by an amount of a non compensatable part of the inter-symbol interference.

24. The apparatus according to claim 21, wherein the coefficient is adapted only if a portion of the respective corrected input element conditional on a non compensatable part of the inter-symbol interference has a different sign from a portion of the respective input element which is not conditional on the inter-symbol interference.

25. The apparatus according to claim 21, wherein the scaling is adaptively determined as a function of the output element preceding the respective output element and an estimated error allocated to an output element preceding the respective output element.

26. The apparatus according to claim 21, wherein the coefficient is adapted only if a portion of the respective corrected input element conditional on a non compensatable part of the inter-symbol interference has the same sign as a portion of the respective input element which is not conditional on the inter-symbol interference.

* * * * *

UNITED STATES PATENT AND TRADEMARK OFFICE
CERTIFICATE OF CORRECTION

| | | |
|---|---|---|
| PATENT NO. | : 7,599,455 B2 | Page 1 of 1 |
| APPLICATION NO. | : 11/361666 | |
| DATED | : October 6, 2009 | |
| INVENTOR(S) | : Norbert Neurohr et al. | |

It is certified that error appears in the above-identified patent and that said Letters Patent is hereby corrected as shown below:

On the Title Page

Item (73), replace "Muncih" with --Munich--.

Signed and Sealed this
Eighth Day of March, 2011

David J. Kappos
*Director of the United States Patent and Trademark Office*